Sept. 3, 1935.  G. R. CORRON ET AL  2,012,941
SUPPORT
Filed June 26, 1934
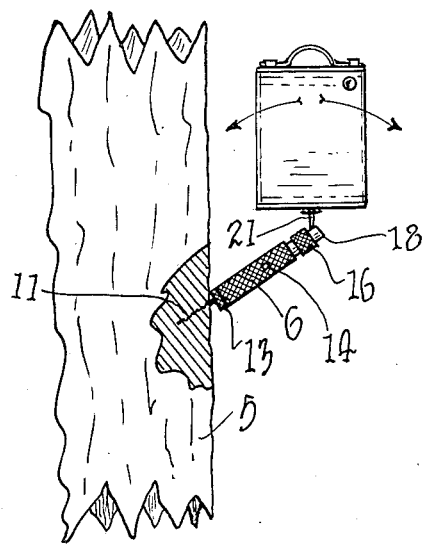
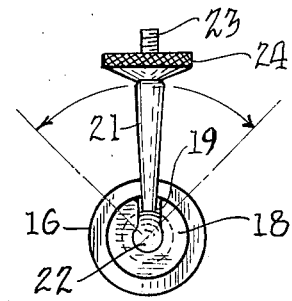
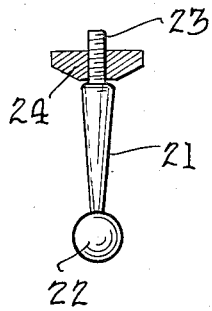
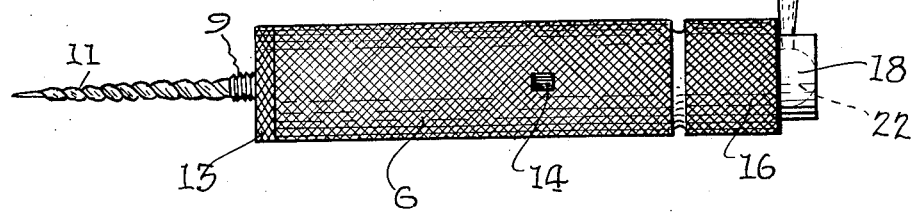
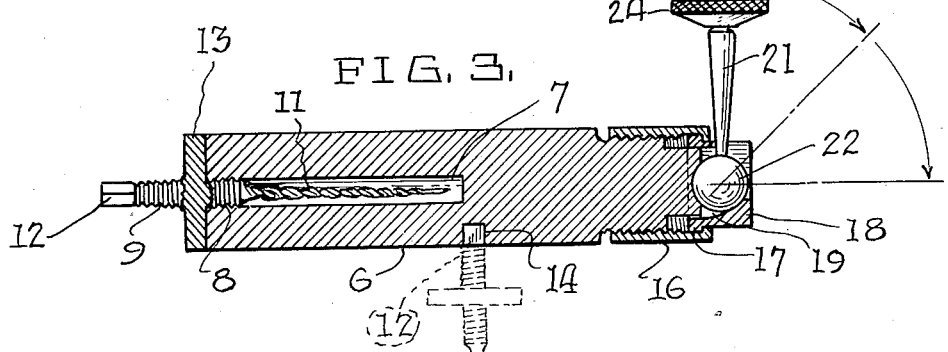
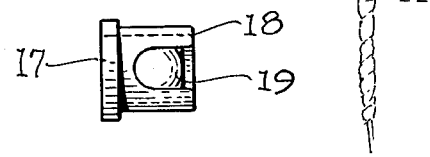
INVENTORS.
George R. Corron
Harry J. Clark
BY
ATTORNEYS.

Patented Sept. 3, 1935

2,012,941

UNITED STATES PATENT OFFICE 2,012,941

SUPPORT

George R. Corron and Harry J. Clark, Seattle, Wash.

Application June 26, 1934, Serial No. 732,531

1 Claim. (Cl. 248—216)

This invention relates to improvements in supports and has particular reference to a support for use with cameras and like structures.

The principal object of the invention is to produce a device which may be inserted in a tree or other similar object for the purpose of supporting a camera or like device from the tree.

A further object is to produce a device which is simple to use, capable of being adjusted to any angle and a device which is inexpensive to manufacture.

A further object is to produce a device which may be readily attached to the tree with a minimum amount of manual effort.

Other objects and advantages will be apparent during the course of the following description.

In the accompanying drawing forming a part of this specification and in which like numerals are employed to designate like parts throughout the same, Fig. 1 is a side elevation of our device as the same would appear in supporting a camera from a tree.

Fig. 2 is an enlarged side elevation of our device with the swivel turned at right angles to the body of the device, Fig. 3 is a cross sectional view of Fig. 2 with the supporting screw housed within the body of the device, Fig. 4 is an end elevation of Fig. 2, Fig. 5 is a side elevation of the swivel and nut therefor, the nut being shown in cross section, and Fig. 6 is a top plan view of the swivel clamp.

There are many instances where it is necessary to rest a camera during the photographing of a scene and there are many instances where it is impossible to employ a tripod due to cramped conditions, inability to carry a tripod, etc. Applicants have, therefore, devised a simple device which performs all the functions of a tripod, yet is readily portable, can be placed in the pocket and may be employed in almost any position or spot where a device of this character could be used.

In the accompanying drawing wherein for the purpose of illustration is shown a preferred embodiment of our invention, the numeral 5 designates a tree trunk, stump or other supporting surface into which our device is adapted to be screwed. By referring to Fig. 2 it will be noted that the numeral 6 designates the body of our device having a bore 7 which is threaded as at 8 so as to receive the threaded portion 9 of a tapered threaded supporting element 11. The supporting element has a squared head 12 and is provided with a lock nut 13. A squared opening 14 is formed in the side of the body 6 the purpose of which will be later seen. The opposite end of the body from that carrying the bore 7 is reduced in cross section and threaded so as to threadedly receive a swivel clamping collar 16. This collar engages the rim 17 of the swivel clamp 18. This clamp has a slot 19 which permits the swivel arm 21 to move through an arc of 90 degrees. The swivel ball 22 is retained between the end of the body portion (which is preferably hollowed to conform to the surface of the ball) and the clamping member 18. The arm 21 has a threaded end 23 upon which a nut 24 is rotatably held.

The manner of using our device is as follows:—

Assuming that the parts are in the position of Fig. 3, the operator loosens the nut 13 and unscrews the supporting member so that the same may be reversed as shown in Fig. 2. This brings the threaded tapered end 11 ready for insertion in a tree stump as shown in Fig. 1. Under ordinary conditions this supporting member will be readily screwed into the wood, a sufficient distance to firmly support the camera. However, should the wood be exceptionally hard or should it be necessary to insert the same in a crack, for instance between a concrete wall, bricks or stones, then the body member 6 is used for a handle in turning the supporting member 11. This is accomplished by placing the body portion 6 over the squared head 12 so that the same fits in the squared opening 14. This is indicated in dotted lines in Fig. 3. The action of the swivel head is self-evident and it is believed that further comment thereon is not necessary as this type of supporting means is commonly employed on various photographic equipment.

It is to be understood that the form of our invention herewith shown and described is to be taken as a preferred example of the same and that various changes relative to the material, size, shape and arrangement of parts may be resorted to without departing from the spirit of the invention or the scope of the subjoined claim.

Having thus described our invention, we claim:—

In a device of the character described, a body portion having a bore in one end thereof, a portion of said bore being threaded, a support engaging element threadedly mounted in said bore and having a lock nut engaging the end of said body portion, said support engaging element having a tapered threaded extremity and a squared head, said head extending beyond the confines of said bore, means formed in said body portion for engaging said squared head when said supporting member is removed from said bore, and a ball retained camera engaging element adjustably secured to said body portion.

GEORGE R. CORRON.
HARRY J. CLARK.